United States Patent
Tibah

(10) Patent No.: US 10,633,540 B2
(45) Date of Patent: Apr. 28, 2020

(54) PREPARATION OF BLOWN POLYMER MODIFIED ASPHALT

(71) Applicant: Denis Muki Tibah, Waxahachie, TX (US)

(72) Inventor: Denis Muki Tibah, Waxahachie, TX (US)

(73) Assignee: Building Materials Investment Corporation, Wilmington, DE (US)

(*) Notice: Subject to any disclaimer, the term of this patent is extended or adjusted under 35 U.S.C. 154(b) by 146 days.

(21) Appl. No.: 15/782,131

(22) Filed: Oct. 12, 2017

(65) Prior Publication Data

US 2018/0105695 A1    Apr. 19, 2018

Related U.S. Application Data

(60) Provisional application No. 62/407,808, filed on Oct. 13, 2016.

(51) Int. Cl.
C08L 95/00     (2006.01)

(52) U.S. Cl.
CPC ........... *C08L 95/00* (2013.01); *C08L 2205/03* (2013.01); *C08L 2555/80* (2013.01); *C08L 2555/86* (2013.01)

(58) Field of Classification Search
CPC .. C08L 95/00; C08L 2205/03; C08L 2555/80; C08L 2555/86
USPC ......................................................... 524/68
See application file for complete search history.

(56) References Cited

U.S. PATENT DOCUMENTS

| | | | |
|---|---|---|---|
| 1,782,186 A | 11/1930 | Abson | |
| 2,179,208 A | 11/1936 | Burk et al. | |
| 2,200,914 A | 5/1940 | Burk et al. | |
| 2,287,511 A | 6/1942 | Burk et al. | |
| 2,370,007 A | 2/1945 | Carr | |
| 2,375,117 A | 5/1945 | Lentz | |
| 2,450,756 A | 10/1948 | Hoiberg | |
| 2,762,755 A | 9/1956 | Kinnaird, Jr. | |
| 2,762,756 A | 9/1956 | Kinnaird, Jr. | |
| 3,126,329 A | 3/1964 | Fort | |
| 4,000,000 A | 12/1976 | Mendenhall | |
| 4,338,137 A | 7/1982 | Goodrich | |
| 4,544,411 A | 10/1985 | Wombles | |
| 4,584,023 A | 4/1986 | Goodrich | |
| 4,659,389 A | 4/1987 | Wombles | |
| 5,306,750 A * | 4/1994 | Goodrich ................ | C08L 95/00 524/59 |
| 5,574,095 A | 11/1996 | Van der Werff | |
| 6,027,557 A * | 2/2000 | Hayner ................... | C08L 95/00 106/279 |
| 6,478,951 B1 | 11/2002 | Labib et al. | |
| 7,309,390 B2 | 12/2007 | Falkiewicz | |
| 7,576,148 B2 * | 8/2009 | Kluttz ..................... | C08L 95/00 524/68 |
| 7,901,563 B2 | 3/2011 | Ruan et al. | |
| 8,901,211 B2 | 12/2014 | Stephens et al. | |
| 9,605,152 B2 * | 3/2017 | Ruan ....................... | C08L 95/00 |
| 2003/0087997 A1 * | 5/2003 | Statz ....................... | C08L 95/00 524/59 |

* cited by examiner

*Primary Examiner* — Ling Siu Choi
*Assistant Examiner* — Ronald Grinsted
(74) *Attorney, Agent, or Firm* — Alvin Rockhill

(57) ABSTRACT

It has been found that numerous benefits can be realized by air blowing asphalt in the presence of at least one highly saturated polymer, such as polyisobutylene, and a reactive polymer having glycidyl groups, such as an ethylene-glycidyl-acrylate. This allows for asphalt streams which would typically not be commercially viable for blowing into industrial asphalt that can be used in roofing products and a wide array of other applications. For instance, this technique can be used to air blow currently available paving grade asphalts into industrial asphalt for roofing products. Other potential benefits include shorter processing time (air blowing time), reduced emissions, and blown coatings with improved weatherability. In one embodiment of this invention asphalt is only partially air blown before adding the polymer to attain a product having desired characteristics for specific applications.

21 Claims, No Drawings

PREPARATION OF BLOWN POLYMER MODIFIED ASPHALT

This application claims benefit of U.S. Provisional Patent Application Ser. No. 62/407,808, filed on Oct. 13, 2016. The teachings of U.S. Provisional Patent Application Ser. No. 62/407,808 are incorporated herein by reference in their entirety.

FIELD OF THE INVENTION

This invention relates to a technique for producing blown polymer modified asphalt which is useful in manufacturing roofing products, such as asphalt roofing shingles, and other industrial applications. It offers the advantage of being capable of using asphalt streams as raw materials which cannot be processed into useful industrial asphalt utilizing conventional techniques.

BACKGROUND OF THE INVENTION

Asphalt offers outstanding binding and waterproofing characteristics. These physical attributes of asphalt have led to its widespread utilization in paving, roofing, and waterproofing applications. For instance, asphalt is used in manufacturing roofing shingles because it has the ability to bind sand, aggregate, and fillers to the roofing shingle while simultaneously providing excellent water barrier characteristics.

Naturally occurring asphalts have been used in various applications for hundreds of years. However, today almost all of the asphalt used in industrial applications is recovered from the refining of petroleum. Asphalt, or asphalt flux is essentially the residue that remains after gasoline, kerosene, diesel fuel, jet fuel, and other hydrocarbon fractions have been removed during the refining of crude oil. In other words, asphalt flux is the last cut from the crude oil refining process.

To meet performance standards and product specifications, asphalt flux that is recovered from refining operations is normally treated or processed to attain desired physical characteristics and to attain uniformity. For instance, asphalt that is employed in manufacturing roofing products has to be treated to meet the special requirements demanded in roofing applications. More specifically, in the roofing industry it is important to prevent asphaltic materials from flowing under conditions of high temperature such as those encountered during hot summers. In other words, the asphaltic materials used in roofing products should maintain a certain level of stiffness (hardness) at high temperatures. This increased level of stiffness is characterized by a reduced penetration, an increased viscosity, and an increased softening point.

To attain the required level of stiffness and increased softening point that is demanded in roofing applications the asphalt flux is typically treated by an air blowing process. In such air blowing techniques, air is blown through the asphalt flux for a period of about 2 to about 8 hours while it is maintained at an elevated temperature which is typically within the range of 400° F. (204° C.) to 550° F. (288° C.). The air blowing process optimally results in the stiffness and the softening point of the asphalt flux being significantly increased. This is highly desirable because ASTM D 3462-96 (Standard Specification for Asphalt Shingles Made from Glass Felt and Surfaced with Mineral Granules) requires roofing asphalt to have a softening point which is within the range of 190° F. (88° C.) to 235° F. (113° C.) and for the asphalt to exhibit a penetration at 77° F. (25° C.) of above 15 dmm (1 dmm=0.1 mm). In fact, it is typically desirable for asphalt used in roofing applications to have a penetration which is within the range of 15 dmm to 35 dmm in addition to a softening point which is within the range of 185° F. (85° C.) to 235° F. (113° C.).

Air blowing has been used to increase the softening point and stiffness of asphalt since the early part of the twentieth century. For example, U.S. Pat. No. 2,179,208 describes a process wherein asphalt is air blown at a temperature of 300° F. (149° C.) to 500° F. (260° C.) in the absence of a catalyst for a period of 1 to 30 hours after which time a catalyst is added for an additional treatment period of 20 to 300 minutes at a temperature of 225° F. (107° C.) to 450° F. (232° C.). Over the years a wide variety of chemical agents have been used as air blowing catalysts. For instance, ferric chloride, $FeCl_3$ (see U.S. Pat. No. 1,782,186), phosphorous pentoxide, $P_2O_5$ (see U.S. Pat. No. 2,450,756), aluminum chloride, $AlCl_3$ (see U.S. Pat. No. 2,200,914), boric acid (see U.S. Pat. No. 2,375,117), ferrous chloride, $FeCl_2$, phosphoric acid, $H_3PO_4$ (see U.S. Pat. No. 4,338,137), copper sulfate CuSO, zinc chloride $ZnCl_2$, phosphorous sesquesulfide, $P_4S_3$, phosphorous pentasulfide, $P_2S_5$, and phytic acid, $C_6H_6O_6(H_2PO_3)_6$ (see U.S. Pat. No. 4,584,023) have all been identified as being useful as air blowing catalysts.

U.S. Pat. No. 2,179,208 discloses a process for manufacturing asphalts which comprises the steps of air-blowing a petroleum residuum in the absence of any added catalysts while maintaining the temperature at about 149° C. to 260° C. (300° F. to 500° F.) and then heating the material at a temperature at least about 149° C. (300° F.) with a small amount of a polymerizing catalyst. Examples of such polymerizing catalysts include chlorosulphonic, phosphoric, fluoroboric, hydrochloric, nitric or sulfuric acids and halides as ferric chloride, aluminum bromide, chloride, iodide, halides similarly of copper, tin, zinc, antimony, arsenic, titanium, etc. hydroxides of sodium, potassium, calcium oxides, sodium carbonate, metallic sodium, nitrogen bases, ozonides and peroxides. Blowing with air can then be continued in the presence of the polymerizing catalyst.

U.S. Pat. No. 2,287,511 discloses an asphalt manufacturing process which involves heating a residuum in the presence of the following catalysts: ferric chloride, aluminum bromide, aluminum chloride, aluminum iodide; halides of copper, tin, zinc, antimony, arsenic, boron, titanium; hydroxides of sodium and potassium; calcium oxides, sodium carbonate, and metallic sodium. These catalysts are described as being present in the asphalt composition in the absence of any injected air. However, air may be injected prior to the addition of the above-cited polymerizing catalysts, but no air is injected when the catalysts have been added to the composition.

U.S. Pat. No. 4,000,000 describes a process for recycling asphalt-aggregate compositions by heating and mixing them with a desired amount of petroleum hydrocarbons containing at least 55% aromatics.

U.S. Pat. No. 2,370,007 reveals a process for oxidizing asphalt which involves air blowing a petroleum oil in the presence of a relatively small amount of certain types of catalysts. These catalysts are organic complexes of metallic salts. Examples of organic complexes of metallic salts that can be used include those obtained from sludges recovered in treating petroleum fractions with metallic salts, such as metallic halides, carbonates and sulfates. The sludge obtained in treating a cracked gasoline with aluminum chloride is disclosed as being particularly suitable in accelerating the oxidation reaction and in producing an asphalt of superior characteristics. The hydrocarbon stocks from which the organic complex of metallic salts may be produced are described as including various hydrocarbon fractions containing hydrocarbons which are reactive with the metallic salts, such as those containing olefinic hydrocarbons. Sludges obtained by treating olefins with aluminum chloride are also described as being useful in the process of this 1943 patent. Other sludges that are identified as being particularly useful can be obtained in the isomerization of hydrocarbons such as butane, pentane and naphtha in the presence of aluminum chloride. These sludges can be obtained by the alkylation of isoparaffins with olefins in the presence of such alkylating catalysts, such as boron trifluoride and the like.

Several patents describe the application of phosphoric mineral acids in modifying asphalt properties. For instance, U.S. Pat. No. 2,450,756 describes a process to make oxidized asphalts by air blowing petroleum hydrocarbon in the presence of a phosphorus catalyst, including phosphorus pentoxide, phosphorus sulfide, and red phosphorus. U.S. Pat. No. 2,762,755 describes a process of air blow asphaltic material in the presence of a small amount of phosphoric acid. U.S. Pat. No. 3,126,329 discloses a method of making blown asphalt through air blowing in the presence of a catalyst which is an anhydrous solution of 50 weight percent to 80 weight percent phosphorus pentoxide in 50 weight percent to 20 weight percent phosphoric acid having the general formula $H_mR_nPO_4$.

In general the air blowing techniques described in the prior art share the common characteristic of both increasing the softening point and decreasing the penetration value of the asphalt flux being treated. In other words, as the asphalt flux is air blown, its softening point increases and its penetration value decreases over the duration of the air blowing procedure. It has been the conventional practice to air blow asphalt flux for a period of time that is sufficient to attain the desired softening point and penetration value. However, in the case of some asphalt fluxes, air blowing to the desired softening point using conventional procedures results in a penetration value which is too low to be suitable for utilization in roofing applications. These asphalt fluxes are called "hard asphalt fluxes". In other words, hard asphalt fluxes cannot be air blown using conventional procedures to a point where both the required softening point and penetration values are attained. Accordingly, there is a need for techniques that can be used to air blow hard asphalt flux to both a softening point which is within the range of 185° F. (85° C.) to 250° F. (121° C.) and a penetration value at 77° F. (25° C.) of above 15 dmm.

U.S. Pat. Nos. 4,659,389 and 4,544,411 disclose the preparation of satisfactory asphaltic roofing fluxes from otherwise unsatisfactory fluxes which involves the addition of asphaltenes, and saturates in quantities which satisfy certain specified conditions. Air oxidation of the flux is described in these patents as being surprisingly accelerated by the addition of highly branched saturates, especially in the presence of a carbonate oxidation catalyst. Some examples of saturates which are described in these patents as being useful in the method described therein include slack wax, petrolatums, hydrocarbyl species, and mixtures thereof.

Numerous prior art references disclose the modification of asphalt with reactive elastomeric terpolymers, including glycidyl methacrylates. These references include U.S. Pat. Nos. 5,574,095, 6,478,951, and 7,309,390 More specifically, U.S. Pat. No. 5,574,095 reveals a method for producing asphalts containing an epoxy-containing polymer. The use of glycidyl functionalized polymers is disclosed by this reference. U.S. Pat. No. 6,478,951 discloses asphalt compositions which are modified with crumb rubber which use glycidyl functionalized polymers as a compatibilizer and U.S. Pat. No. 7,309,390 reveals paving asphalt compositions which utilize glycidyl functionalized polymers as asphalt modifiers.

U.S. Pat. No. 7,901,563 discloses a method for preparing an industrial asphalt comprising (1) heating an asphalt flux to a temperature which is within the range of about 400° F. (204° C.) to 550° F. (288° C.) to produce a hot asphalt flux, (2) sparging an oxygen containing gas through the hot asphalt flux for a period of time which is sufficient to increase the softening point of the asphalt flux to a value of at least 100° F. (38° C.), to produce an underblown asphalt composition; and (3) mixing a sufficient amount of a polyphosphoric acid throughout the underblown asphalt composition while the underblown asphalt composition is maintained at a temperature which is within the range of 200° F. (93° C.) to 550° F. (288° C.) to attain a softening point which is within the range of 185° F. (85° C.) to 250° F. (121° C.) and a penetration value of at least 15 dmm at 77° F. (25° C.) to produce the industrial asphalt. The techniques disclosed in this patent is useful in that it can be used to increase the softening point of hard asphalt flux to a commercially desirable level while maintaining the penetration value of the asphalt above 15 dmm at 77° F. (25° C.). Accordingly, this technique can be used to produce industrial asphalt having a desirable softening point and penetration value using hard asphalt flux as the starting material.

U.S. Pat. No. 8,901,211 reveals a method for preparing an industrial asphalt comprising sparging an oxygen containing gas through an asphalt flux in the presence of 0.25 weight percent to about 12 weight percent of a highly saturated rubbery polymer at a temperature within the range of about 400° F. to about 550° F. for a period of time which is sufficient to increase the softening point of the asphalt flux to a value which is within the range of 185° F. to 250° F. and a penetration value of at least 15 dmm to produce the industrial asphalt. The highly saturated rubbery polymer can be a styrene-ethylene/butylene-styrene block copolymer rubber or a highly saturated styrene-ethylene/propylene-styrene block copolymer rubber.

The supply and quality of PEN grade asphalts or flux which are typically oxidized into blown coating for roofing and other applications is either fluctuating and/or dwindling. However, there are other types of asphalt streams which are readily available. For instance, performance grade (PG) asphalts for paving applications represent a majority of the asphalt currently available. Unfortunately, when air blown, these performance grade asphalts typically have a high stiffness modulus as compared to asphalt flux which is typically used. Accordingly, performance grade asphalts typically fail to meet the fit for use criteria as a roofing coating. In most cases, blown coating produced from such asphalt grades show susceptibility to oxidative aging and marginal weatherability. In addition to this, when such asphalt streams and similarly stiff asphalts are blown using conventional air blowing methods, the resulting properties of the blown asphalt typically pose challenges during further processing into an intermediate product, such as filled coating for roofing shingles and other end use applications.

High shear mills have been used to blend polymers and other additives into asphalts, but there are very few asphalts streams that are compatible with these polymers and the polymer modified asphalt produced typically tend to have lower stiffness modulus. The milling system also requires significant capital investment to implement. Asphalt air blown with catalysts, such as ferric chloride (FeCl$_3$), phosphorous pentoxide (P$_2$O$_5$) and additives, such as polyphosphoric acid have also been used to reduce processing time and influence stiffness of blown asphalts. However, these products are typically not totally consumed in the reaction and have residual effects which could diminish the weatherability of the blown asphalt coating, show property creep over time, and also present handling challenges for such catalysts and additives.

SUMMARY OF THE INVENTION

The technology of this invention allows for these asphalt streams which would typically not be useful for blowing to be blown into industrial asphalt that can be used in roofing products and a wide array of other applications. This is accomplished by conducting the air blowing in the presence of a saturated polymer, such as polyisobutylene and a polymer which is capable of undergoing epoxy chemistry to react with the asphalt, such as a glycidyl functionalized polymer, an acrylate polymer, an acrylate copolymer, an acrylic acid polymer, and the like. In effect this invention make use of a liquid polymer which is readily miscible in asphalt and a solid polymer which needs very minimal shearing into the asphalt prior to air blowing the asphalt polymer admixtures. In any case, both polymers are able to interact with the asphalt yet remain relatively stable to decomposition at the high temperatures which are typically encountered during air blowing. Potential benefits that can be attained by practicing the subject invention include shorter processing time (air blowing time), reduced emissions, and blown coatings with improved weatherability. In one embodiment of this invention asphalt is only partially air blown before adding the polymer to attain a product having desired characteristics.

This invention is more specifically discloses a method for preparing an industrial asphalt comprising air blowing an asphalt flux in the presence of at least one highly saturated polymer and a reactive polymer having glycidyl groups. In one embodiment of this invention the highly saturated polymer can be a polyisobutylene and the reactive polymer can be an ethylene-glycidyl-acrylate. The highly saturated polymer can be added to the asphalt before starting the air blowing process or it can be added after the asphalt is partially or fully air blown.

DETAILED DESCRIPTION OF THE INVENTION

The process of this invention is useful for air blowing a wide variety of asphalts. The asphalt flux is normally the petroleum residue from a vacuum distillation column used in refining crude oil. Such asphalt typically has a softening point which is within the range of 60° F. to 135° F. (16° C. to 57° C.) and more typically has a softening point which is within the range of 80° F. to 110° F. (27° C. to 43° C.). It also typically has a penetration value of as low as 30 dmm at 77° F. and more typically has a penetration value of at least 50 dmm at 77° F. (25° C.). The asphaltic material used as the starting material can also be solvent extracted asphalt, naturally occurring asphalt, or synthetic asphalt. Blends of such asphaltic materials can also be treated by the process of this invention. The asphalt flux can also include polymers, recycled tire rubber, recycled engine oil residue, recycled plastics, softeners, antifungal agents, biocides (algae inhibiting agents), and other additives. Tar and pitch can also be used as the starting material for treatment by the technique of this invention. However, the technique of this invention is particularly useful for air blowing asphalt flux that would not ordinarily be capable of being air blown into useful industrial asphalt compositions, such as performance grade asphalt (which is typically used in paving applications) and hard asphalt flux.

The hard asphalt flux is characterized in that it cannot be air blown to attain both a softening point which is within the range of 185° F. (85° C.) to 250° F. (121° C.) and a penetration value of at least 15 dmm. However, it should be understood that the process of this invention is also applicable to the treatment of virtually any asphaltic materials in addition to hard asphalt flux. The technique of this invention is of particular value in the treatment of hard asphalt flux that is impossible to air blow utilizing standard air blowing methods into industrial asphalt having properties suitable for use in roofing applications.

In any case, this invention can be practiced by simply air blowing asphalt in the presence of at least one highly saturated polymer and a reactive polymer having glycidyl groups. In the first step of the process of this invention the asphalt flux, typically a hard asphalt flux, is heated to a temperature which is within the range of about 120° F. (49° C.) to 550° F. (288° C.) to produce a hot asphalt flux. In any case, the asphalt flux will be heated to a temperature which is sufficient to provide for good mixing. In many cases the asphalt flux will be heated to a temperature which is within the range of about 200° F. (93° C.) to about 500° F. (260° C.). The asphalt flux will frequently be heated to a temperature which is within the range of about 250° F. (121° C.) to about 400° F. (204° C.) or 450° F. (232° C.) to produce the hot asphalt flux at which point the reactive polymer is added and in one embodiment of this invention the highly saturated rubbery polymer is also added. Then the asphalt flux is heated to the desired air blowing temperature which is typically within the range of 400° F. (204° C.) to 700° F. (371° C.) and more typically within the range of 450° F. (232° C.) to 525° F. (274° C.). It is often preferred to utilize an air blowing temperature which is within the range of 475° F. (246° C.) to 525° F. (274° C.). In any case the hot asphalt flux containing the reactive polymer and optionally the saturated rubbery polymer is then air blown to the desired softening point which is typically within the range of 185° F. (85° C.) to 250° F. (121° C.) by blowing an oxygen containing gas through the hot asphalt flux for the time required to attain the desired softening point while maintaining a penetration value of at least 15 dmm to produce the industrial asphalt. It should be noted that the highly saturated polymer can be added after the asphalt flux is partially air blown and in one embodiment of this invention after it is completely air blown.

The oxygen containing gas (oxidizing gas) is typically air. The air can contain moisture and can optionally be enriched to contain a higher level of oxygen. For example, oxygen enriched air containing from about 25 weight percent to about 35 weight percent oxygen and about 65 weight percent to about 75 weight percent nitrogen can be employed. Chlorine enriched air or pure oxygen can also be utilized in the air blowing step. For instance, chlorine enriched air containing from about 15 weight percent to about 25 weight percent oxygen, about 5 weight percent to about 15 weight percent chlorine, and from about 60 weight percent to about 80 weight percent nitrogen can be utilized as the oxidizing gas.

The duration of the air blow will, of course, be sufficient to attain the desired final softening point and with typically be within the range of about 1 hour to about 30 hours. Air blow can be performed either with or without a conventional air blowing catalyst. However, air blowing catalysts are typically added to the asphalt flux to reduce the air blow time needed to attain the desired softening point. Some representative examples of air blowing catalysts include ferric chloride (FeCl$_3$), phosphorous pentoxide (P$_2$O$_5$), aluminum chloride (AlCl$_3$), boric acid (H$_3$BO$_3$), copper sulfate (CuSO$_4$), zinc chloride (ZnCl$_2$), phosphorous sesquesulfide (P$_4$S$_3$), phosphorous pentasulfide (P$_2$S$_5$), phytic acid (C$_6$H$_6$[OPO—(OH)$_2$]$_6$), and organic sulfonic acids. In any case, the duration of the air blow will more typically be within the range of about 2 hours to about 20 hours and is more typically be within the range of about 4 hours to about 10 hours or 12 hours. The air blowing step will preferably take about 2 hours to about 8 hours and will more typically take about 3 hours to about 6 hours.

Typically about 0.25 weight percent to about 15 weight percent of the highly saturated rubbery polymer will be added to the asphalt flux. More typically, about 0.25 weight percent to about 10 weight percent of the highly saturated rubbery polymer will be added to the asphalt flux. Generally, about 1 weight percent to about 12 weight percent of the highly saturated rubbery polymer will be added to the asphalt flux. More generally, about 2 weight percent to about 10 weight percent of the highly saturated rubbery polymer will be added to the asphalt flux. It is generally preferred for the highly saturated rubbery polymer to be present in the asphalt flux at a level which is within the range of about 3 weight percent to about 10 weight percent with levels within the range of about 4 weight percent to about 8 weight percent being most preferred.

The highly saturated rubbery polymer will typically be mixed into the asphalt flux in the form of a liquid in the case of rubbery polymer like PIB or in the form of a powder in the case of solid rubbery polymers, such as SEBS and SEPS. This mixing can normally be accomplished by sparging a gas (either an inert gas or an oxygen containing gas) through the asphalt flux to thoroughly mix the highly saturated rubber into it. Accordingly, it is generally not necessary to utilize a Seifer mill or other similar equipment to generate high shear conditions in order to attain adequate mixing of the highly saturated rubbery polymer throughout the asphalt flux.

The asphalt flux which is air blown in accordance with this invention will typically be essentially free of sodium carbonate and in most cases will be void of sodium carbonate. The ratio of asphaltenes plus polars to saturates in the asphalt flux which is air blown in accordance with this invention can be greater than 2.5 and will frequently be greater than 2.8, 2.9, or even 3.0. Thus, the asphalt flux which is air blown in accordance with this invention will normally satisfy the equation (A+P)/(S)>2.5, wherein "A" represents the weight of asphaltenes in the flux, wherein "P" represents the weight of polars in the flux, and wherein "S" represents the weight of saturates in the flux, and wherein the symbol ">" means greater than. In many cases, (A+P)/(S) will be greater than 2.7, 2.9, 3.0 or even 3.2.

The method used to determine the asphaltene, polar, aromatic and saturate content of the roofing fluxes is the clay-gel adsorption chromatographic method of ASTM D-2007. The first step of the clay-gel analysis involves dissolving of the sample to be analyzed into 40 milliters of pentane for each gram of the sample. The pentane insoluble fraction of the asphalt which is removed by filtration is called the "asphaltenes". The pentane soluble part of the asphalt, which is called the "maltenes" is eluted through a separable colinear two part column apparatus in which the top column is packed with attapulgus clay and the bottom column is packed with silica gel and attapulgus clay. The two columns are eluted with pentane until 250 ml of pentane eluent has been collected. At this time, the elution of the columns with pentane is stopped, the pentane is evaporated and the residual material obtained is designated as the saturates.

The next step in the clay-gel analysis is to separate the two part column. The attapulgus clay (top) column is eluted with a 50:50 (by volume) mixture of benzene and acetone. The elution is continued until the benzene and acetone mixture emerging from the end of the column is colorless. At this time, the elution is stopped, the benzene-acetone mixture collected is evaporated and the residual material is designated as polars. At this point the asphaltenes, saturates and polars have been determined directly so the aromatics are determined by difference to complete the clay-gel analysis. Other methods which will give results similar to the clay-gel analysis are liquid chromatographic methods, such as the Corbett analysis, ASTM D-4124, and many high performance liquid chromatographic methods.

At least 95 weight percent of the repeat units in the highly saturated rubbery polymers used in the practice of this invention will be totally saturated (contain no double bonds). It is typically preferred for at least 97 weight percent and more preferable 98 weight percent of the repeat units in the highly saturated rubbery polymers to be totally saturated. In many cases the highly saturated rubbery polymers used in the practice of this invention will be completely saturated (contain no double bonds). Some representative examples of highly saturated rubbery polymers that can be used include polyisobutylene (PIB), butyl rubber, styrene-ethylene/butylene-styrene block polymers (SEBS), styrene-ethylene/propylene-styrene block polymers (SEPS), ethylene-propylene rubber, hydrogenated nitrile rubber, and the like. The highly saturated rubbery polymer can have a molecular weight which ranges from being relatively low to being relatively high and will preferably be primarily linear (contain less than 2% and typically less than 1% carbon atoms which are branch points for polymer chains that contain at least 3 carbon atoms), based upon the total weight of the polyisobutylene polymer. Highly saturated polymer that can be used in the practice of this invention are further described in U.S. Pat. No. 8,901,211. The teachings of U.S. Pat. No. 8,901,211 are incorporated by reference herein for the purpose of describing such highly saturated polymers.

The polyisobutylene that can be used in the practice of this invention is a homopolymer of isobutylene and is of the formula:

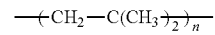

wherein n is an integer that represents the number of isobutylene repeat units in the polymer. The polyisobutylene will typically be a highly linear polymer will accordingly contain less than 2 percent and preferably contains less than 1 percent carbon atoms which act as branch points for polymer side chains that contain at least 3 carbon atoms, based upon the total weight of the polyisobutylene polymer. The butyl rubber that can be used in the practice of this invention is a copolymer of isobutylene and isoprene that contains about 98 weight percent to 99 weight percent isobutylene and about 1 weight percent to about 2 weight percent isoprene. Butyl rubber is accordingly of the formula:

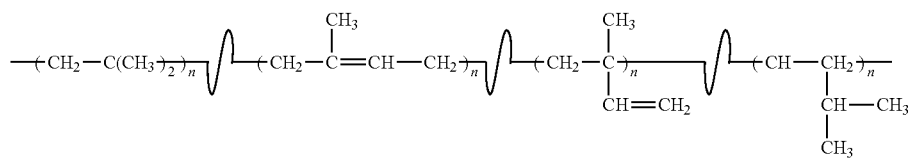

wherein n represents the number of polyisobutylene repeat units, 1,4-polyisoprene repeat units, 1,2-polyisoprene repeat units, and 3,4-polyisoprene repeat units in the butyl rubber, and wherein indicates that the repeat units in the polymer can be distributed in any order, such as in a random order. In many cases the highly saturated polymers of this invention, such as SEBS block copolymers, will contain repeat units which are of the formula:

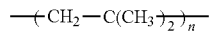

wherein n is an integer representing the number of isobutylene repeat units in the polymer.

The method of this invention can be employed in making novel industrial asphalt compositions which is comprised of (1) asphalt and (2) from about 0.1 weight percent to about 12 weight percent of a A-B-A block copolymer rubber having A blocks which are comprised of repeat units which are derived from at least one vinyl aromatic monomer and a B block which is comprised of isobutylene repeat units, wherein the industrial asphalt composition has a softening point which is within the range of 185° F. to 250° F. and a penetration value of at least 15 dmm. The A-B-A block copolymer will typically be present in the industrial asphalt at a level which is within the range of about 0.25 weight percent to about 8 weight percent. The A-B-A block copolymer rubber in these compositions has A blocks which are comprised of repeat units which are derived from at least one vinyl aromatic monomer. The vinyl aromatic monomer will typically contain from 8 to 20 carbon atoms. In most cases the vinyl aromatic monomer will contain from 8 to 14 carbon atoms. Some representative examples of vinyl aromatic monomers that can be utilized include styrene, 2-methylstyrene, 3-methylstyrene, 4-methylstyrene, α-methyl styrene, 2,4-dimethylstyrene, 2,4-diisopropylstyrene, 4-tert-butylstyrene, 1-vinylnaphthalene, 2-vinylnaphthalene, 4-phenylstyrene, 3-phenylstyrene and the like. The B block is comprised of isobutylene repeat units and can optionally further include repeat units that are derived from α-olefin monomers containing from 2 to about 6 carbon atoms, such as ethylene, propylene, 1-butene, 1-pentene, and the like. Such industrial asphalt compositions typically have a flash point which is higher than about 550° F. (288° C.) and generally have a flash point which is within the range of 550° F. (288° C.) to about 700° F. (371° C.). In many cases the industrial asphalt will have a flash point which is within the range of 550° F. (288° C.) to about 625° F. (329° C.).

The reactive polymer will preferably have ethylene backbone which is modified with a glycidyl functional group. It will also preferably be modified with an acrylate functional group. A highly preferred reactive polymer is an ethylene-glycidyl-acrylate. Such a commercially available terpolymer is sold by DuPont as Elvaloy® ethylene-glycidyl-acrylate terpolymer. In any case, the reactive polymer will typically be included at a level which is within the range of about 0.25 weight percent to 6 weight percent, based upon the total weight of the asphalt composition. The reactive polymer will more typically be included at a level which is within the range of 0.5 weight percent to 4 weight percent and will preferably be included at a level which is within the range of 1 weight percent to 3 weight percent.

The industrial asphalt made can be used in making roofing products and other industrial products using standard procedures. For instance, the industrial asphalt can be blended with fillers, stabilizers (like limestone, stonedust, sand, granule, etc.), polymers, recycled tire rubber, recycled engine oil residue, recycled plastics, softeners, antifungal agents, biocides (algae inhibiting agents), and other additives.

This invention is illustrated by the following examples that are merely for the purpose of illustration and are not to be regarded as limiting the scope of the invention or the manner in which it can be practiced. Unless specifically indicated otherwise, parts and percentages are given by weight.

EXAMPLES

Asphalt samples having the compositions shown in Table 1 were air blown with the reactive polymer and the highly saturated polymer both being added to the asphalt flux before that air blowing procedure was started. As can be seen in Example 3 of Stream B, in the case where the Elvaloy® AM ethylene-glycidyl-acrylate was included as a reactive polymer a 83% improvement in accelerated oxidative aging resistance was achieved as compared to unmodified samples. As can also be seen, including the reactive polymer also resulted in the modified asphalt having a penetration as adjusted to 208° F. of 16.2. This is in contrast to the other air blown samples make with Asphalt Stream B which had adjusted penetration values of less than 15 dmm. Accordingly, this set of experiments show the unexpected benefit which is realized by including the reactive polymer in the asphalt being air blown.

Table 2 shows the properties of asphalt where polymer was added after various asphalt streams were air blown to different softening points.

TABLE 1.0

Polymer added prior to air blowing polymer/asphalt admixture

| Asphalt Stream | Example | % PIB 1350 | Softening Point (° F.) | Penetration at 77° F. (dmm) | Penetration adjusted to 208° F. Softening Point (dmm) | Viscosity at 400° F. (cP) | COC Flash Point °(F) | Stain | Air Blowing Time (Minutes) | Lab Blow Loss (%) | Improvement in Accelerated Oxidative Aging resistance compared to unmodified sample (%) |
|---|---|---|---|---|---|---|---|---|---|---|---|
| A | 1 | 0.0 | 209 | 11.3 | 11.5 | 395 | 615 | | 200 | 3.91 | |
| | 2 | 6.0 | 208 | 16.0 | 16.0 | 207 | 620+ | | 107 | 1.45 | |
| | 3 | 8.0 | 210 | 18.3 | 18.5 | 181 | 610 | 3.0 | 87 | 1.87 | |

TABLE 1.0-continued

Polymer added prior to air blowing polymer/asphalt admixture

| Asphalt Stream | Example | % PIB 1350 | Softening Point (° F.) | Penetration at 77° F. (dmm) | Penetration adjusted to 208° F. Softening Point (dmm) | Viscosity at 400° F. (cP) | COC Flash Point °(F) | Stain | Air Blowing Time (Minutes) | Lab Blow Loss (%) | Improvement in Accelerated Oxidative Aging resistance compared to unmodified sample (%) |
|---|---|---|---|---|---|---|---|---|---|---|---|
| B | 1 | 0.0 | 208 | 8.0 | 8.0 | 421 | 620+ | 2.8 | 275 | 3.2 | |
|   | 2 | 8.0 | 209 | 13.0 | 13.2 | 215 | 590 | 2.5 | 196 | 1.76 | |
|   | 3* | 8.0 + 2.0 Elvaloy AM | 206 | 16.6 | 16.2 | 340 | 620+ | 2.3 | 160 | 2.15 | 83 |
| C | 2 | 0.0 | 208 | 11.0 | 11.0 | 395 | 620+ | 4.4 | 297 | 2.63 | |
|   | 3 | 8.0 | 208 | 18.0 | 18.0 | 152 | 620+ | 3.2 | 199 | 1.95 | 30.3 |
| D | 1 | 0.0 | 208 | 14.6 | 14.6 | 244 | 620+ | 7.6 | 230 | 2.79 | |
|   | 2 | 4.0 | 212 | 16.6 | 17.4 | 239 | 607 | 6.1 | 195 | 2.25 | |
|   | 3 | 6.0 | 211 | 19.0 | 19.6 | 172 | 610 | 5.5 | 158 | 2.3 | 4.5 |
| E | 1 | 0.0 | 210 | 11.3 | 11.5 | 391 | 620+ | 4.2 | 317 | 8.2 | |
|   | 2 | 8.0 | 214 | 16.6 | 17.8 | 197 | 600 | 3.1 | 218 | 5.73 | |
| F | 1 | 0.0 | 209 | 11.7 | 11.9 | 321 | 620+ | 5.3 | 229 | 6.45 | |
|   | 2 | 8.0 | 216 | 19.0 | 20.6 | 163 | 605 | 3.2 | 150 | 3.03 | |
|   | 3 | 6.0 | 218 | 16.0 | 18.0 | 205 | 620+ |  | 167 | 3.18 | |
| G | 1 | 0.0 | 208 | 17.0 | 17.0 | 264 | 620+ | 6.4 | 363 | 4.88 | |
|   | 2 | 8.0 | 206 | 27.0 | 26.6 | 152 | 620+ | 3.6 | 256 | 3.28 | 20.4 |

TABLE 2.0

Polymer added after various asphalt streams were air blown to different Softening Points

| Asphalt Stream | Example | % PIB 1350 | Softening Point (° F.) | Penetration at 77° F. (dmm) | Viscosity at 400° F. (cP) | COC Flash Point (° F.) | Stain | Air Blowing Time (Minutes) | Lab Blow Loss (%) |
|---|---|---|---|---|---|---|---|---|---|
| A | 1 | 0.0 | 209 | 11.3 | 395 | 615 | | 200 | 3.91 |
|   | 2 | 8.0 | 246 | 13.0 | 575 | 620+ | | | |
|   | 1 | 0.0 | 183 | 17.3 | 174 | 620+ | 4.0 | 148 | 2.62 |
|   | 2 | 8.0 | 219 | 17.6 | 228 | 620+ | 3.5 | | |
| C | 1 | 0.0 | 208 | 11.0 | 395 | 620+ | 4.4 | 297 | 2.63 |
|   | 2 | 8.0 | 241 | 13 | 420 | 620+ | | | |
|   | 1 | 0.0 | 183 | 16.0 | 148 | 620+ | 8.7 | 212 | 1.26 |
|   | 2 | 8.0 | 217 | 16.0 | 183 | 620+ | 4.8 | | |
| D | 1 | 0.0 | 208 | 14.6 | 244 | 620+ | 7.6 | 230 | 2.79 |
|   | 2 | 8.0 | 238 | 14.6 | 334 | 620+ | 4.2 | | |

Table 3 shows some properties of two different paving grade asphalts that were modified by adding polyisobutylene to the asphalt before it had been air blown. As can be seen from Table 3, the addition of the polyisobutylene (PIBI) to the paving grade asphalt at a level of 8% significantly increased its softening point and also significantly reduced its penetration value. In one embodiment of this invention, such a polymer modification of paving grade asphalt with a highly saturated rubbery polymer, such as polyisobutylene, can be done prior to air blowing to attain desired characteristics in the final air blown industrial asphalt.

TABLE 3

POLYMER ADDED TO ASPHALT STREAMS WHICH HAVE NOT BEEN AIR BLOWN

| Example | Asphalt Stream | PIBI | Softening Point | Penetration at 77° F. | Viscosity at 400° F. | COC Flash Point |
|---|---|---|---|---|---|---|
| 1 | PG 67-22 | 0.0% | 129° F. | 59 dmm | 49 cP | 610° F. |
| 2 | PG 67-22 | 8.0% | 146° F. | 44 dmm | 53 cP | 605° F. |
| 3 | PG 64-22 | 0% | 117° F. | 83 dmm | 34 cP | 620+° F. |
| 4 | PG 64-22 | 8% | 132° F. | 73 dmm | 41 cP | 620+° F. |

While certain representative embodiments and details have been shown for the purpose of illustrating the subject invention, it will be apparent to those skilled in this art that various changes and modifications can be made therein without departing from the scope of the subject invention.

What is claimed is:

1. A method for preparing an industrial asphalt comprising air blowing an asphalt in the presence of at least one highly saturated polymer and a reactive polymer having glycidyl groups, wherein the air blowing is carried out by sparging an oxygen containing gas through the asphalt at temperature which is within the range of 400° F. to 700° F.

2. The method of claim 1 wherein the reactive polymer has an ethylene backbone which is modified with a glycidyl functional group.

3. The method of claim 2 wherein the reactive polymer is modified with an acrylate functional group.

4. The method of claim 1 wherein the reactive polymer is an ethylene-glycidyl-acrylate.

5. The method of claim 1 wherein the highly saturated polymer is a highly saturated rubbery polymer.

6. The method of claim 5 wherein the highly saturated rubbery polymer contains repeat units of the formula:

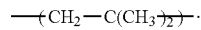

7. The method of claim 1 wherein the highly saturated polymer is present at a level which is within the range of about 0.25 weight percent to about 15 weight percent.

8. The method of claim 1 wherein the highly saturated polymer is present at a level which is within the range of about 1 weight percent to about 12 weight percent.

9. The method of claim 1 wherein the highly saturated polymer is present at a level which is within the range of about 2 weight percent to about 10 weight percent.

10. The method of claim 1 wherein the highly saturated polymer is present at a level which is within the range of about 3 weight percent to about 10 weight percent.

11. The method of claim 1 wherein the reactive polymer is present at a level which is within the range of about 0.25 weight percent to 6 weight percent.

12. The method of claim 1 wherein the reactive polymer is present at a level which is within the range of about 0.5 weight percent to 4 weight percent.

13. The method of claim 1 wherein the reactive polymer is present at a level which is within the range of about 1 weight percent to 3 weight percent.

14. The method of claim 1 wherein the industrial asphalt has a softening point which is within the range of 190° F. to 240° F., and wherein the industrial asphalt has a penetration value which is within the range of 15 dmm to 25 dmm.

15. The method of claim 1 wherein the air blowing is carried out by sparging an oxygen containing gas through the asphalt at temperature which is within the range of 450° F. to about 550° F. for a period of time which is within the range of 2 hours to 20 hours.

16. The method of claim 1 wherein asphalt is further comprised of an air blowing catalyst.

17. The method of claim 1 wherein the highly saturated polymer is added to the asphalt prior to air blowing.

18. The method of claim 1 wherein the reactive polymer is added to the asphalt prior to air blowing.

19. The method of claim 1 wherein the air blowing is carried out by sparging an oxygen containing gas through the asphalt at temperature which is within the range of 475° F. to about 550° F. for a period of time which is within the range of 3 hours to 12 hours.

20. The method of claim 15 wherein the air blowing is carried out by sparging an oxygen containing gas through the asphalt for a period of time which is within the range of 4 hours to 12 hours.

21. The method of claim 1 wherein the reactive polymer and the highly saturated polymer are added to the asphalt prior to air blowing.

* * * * *